United States Patent [19]

Ise et al.

[11] Patent Number: 4,554,532
[45] Date of Patent: Nov. 19, 1985

[54] AUTOMATIC RECEIVER GAIN CONTROL IN CENTRALIZED MONITOR SYSTEM

[75] Inventors: Masahiro Ise, Kashihara; Hidehiko Tanaka, Tenri; Katsuyuki Machino, Nara; Toshiyuki Matsubara; Teiji Terasaka, both of Tenri, all of Japan

[73] Assignee: Sharp Kabushiki Kaisha, Osaka, Japan

[21] Appl. No.: 455,770

[22] Filed: Jan. 5, 1983

[30] Foreign Application Priority Data

Jan. 11, 1982 [JP] Japan .................................. 57-3178

[51] Int. Cl.⁴ ...................... G08B 23/00; H04M 11/04
[52] U.S. Cl. ...................................... 340/501; 340/531; 340/538; 340/310 R; 455/3; 455/69; 358/174
[58] Field of Search ............... 340/501, 500, 533, 538, 340/531, 310 R, 310 CP, 534; 455/3, 4, 5, 69; 358/86, 174; 330/260, 51, 282, 85, 86

[56] References Cited

U.S. PATENT DOCUMENTS 4,028,628  6/1977  Rao et al. ............................. 358/174
4,262,283  4/1981  Chamberlain et al. ............. 340/533

Primary Examiner—Donnie L. Crosland
Attorney, Agent, or Firm—Birch, Stewart, Kolasch & Birch

[57] ABSTRACT

A centralized monitor system can be automatically controlled so that the signal receiving levels in each component of the system can be held at an optimum position even in the presence of noise components, since they are totally free from any failure caused by the noise interference. More particularly, the monitor panel as part of the centralized monitor system collects and displays any alarm information detected by any of the sub units constituting part of the system while using the indoor power line as the data transmission path, enabling the centralized monitor system to generate an alarm upon receipt of such alarm information from the monitor panel, while the automatic receiver gain controller, in responding to an answer back instruction periodically output by the monitor panel, properly controls both the monitor panel and sub units so that both will remain in such positions where their incoming signal levels can be held optimum even under presence of a variety of noise components.

8 Claims, 4 Drawing Figures

AUTOMATIC RECEIVER GAIN CONTROL IN CENTRALIZED MONITOR SYSTEM

BACKGROUND OF THE INVENTION

Generally speaking, an internal power line is may be used as the data transmission path of a gas centralized monitor system in collective residences such as condominiums in order to reduce system cost. Since a variety of electric appliances are connected to the power line, both the impedance and noise level through the power line are randomly variable. As a result, if the receiving level remains stationary and the signal level decreases, the needed data will be missed or the signal itself may not be received due to the presence of noise components.

The present invention relates to a means for providing an optimum signal receiving level under such circumstances. FIG. 1 shows the construction of a centralized monitor system, where the transmission sub units 1 each incorporating a sensor, monitor panel 2 as the main unit, and the power line 3 as the data transmission path, are characteristically provided.

The monitor panel 2 transmits an answer back instruction in order to periodically check a variety of the existing conditions of the sub units. Assuming that the period of such a checking operation is "r", if the monitor unit still cannot receive any data from any of the sub units even after a maximum of 2r hours have past, then it shows that the pre-set signal receiving level is too low. On the other hand, there is a certain noise component caused by a variety of electric appliances, which constantly flows through the power line at a much higher level than the white level. As a result, if the received signal is too sensitive, the monitor panel cannot correctly identify if it is a signal or noise, and then all the signals cannot be received. Actually, the optimum receiving level exists between the ranges of the signal and noise.

In general, since there are a variety of noises that flow through the power line, no data can effectively be transmitted merely by lowering the signal sensitivity after detecting any of the noise components.

Co-pending application Ser. No. 436,931 filed on Oct. 27, 1982, to Ise et al. and entitled "Noise Reduction In Signal Transmission System Over Building Power Distribution Wiring" discloses a transmission system comprising means related to a data transmission method using the power supply line in order to send and receive the carrier to and from the indoor distribution line, synchronous with the power source frequency. This system uses a phase period, for example, on half of the power cycle, as the period corresponding to the period of the power voltage against the binary data "1" and "0". Here, two bits are used to transmit one bit of data by transmitting 10 (or 01) for a data "1" and 01 (or 10) for a data "0", whereas, during the signal reception period, either the counted number of pulses responding to the carrier existing in the corresponding phase period or the difference of the sum of the carrier duration time is read out, and receives only such data which exceeds the pre-set value.

For example, the operation of this system may be shown in FIG. 2. If the noise components (shown by fine tilt lines) and the signal components (shown by coarse tilt lines) coexist and if the detection level is set at position "a", the signal can be correctly detected, although a certain amount of noise may remain. If the detection level is at position "b", it cannot be identified as either a signal or noise, and no signal can be received. If the detection level is at position "c", neither noise nor signal can be detected. The method embodied in the invention related to the co-pending application eliminates the cumulative difference as a noise component if it is within the preset value. However, as is clear from FIG. 2, after the software procedures are completed, none of the combinations other than the basic bits 01 and 10 may be generated in principle. Receipt of such bits as 00 and 11 is therefore caused solely by inadequate sensitivity.

In other words, assuming that the half period of the power source corresponds to the basic bits, the four basic bits shown in the table below respectively have the meaning which are caused by inadequate sensitivity in the signal reception.

| Basic bits | Meanings |
| --- | --- |
| 00 | Data level is too low |
| 01 | Data is "0" |
| 10 | Data is "1" |
| 11 | Too much noise exists |

SUMMARY OF THE INVENTION

In the light of such an inconvenience as is mentioned above, the present invention aims to automatically control the signal receiving level constantly in an optimum position even with the presence of noise, by periodically outputting an answer back instruction from the monitor panel.

Signal sensitivity is variable by (1) varying the reference level of the level detector, and (2) by varying the gain of the receiver. However, due to saturation effects that limit the transmission of receivable signals, method (2) is preferable.

The present invention provides an automatic receiver gain control in the centralized monitor system comprising a monitor panel which collects and displays any alarming information detected by any of the sub units while using the indoor power line as the data transmission path, and the centralized monitor system which generates an alarm upon receiving such alarm information from the monitor panel, while the automatic receiver gain controller, in response to an answer back instruction periodically sent by the monitor panel, properly controls both the monitor panel and sub units so that both will remain in such positions where the receiving level of input signals can be held at a constantly optimum level.

BRIEF DESCRIPTION OF THE DRAWING

The present invention will be better understood from the detailed description given hereinbelow and the accompanying drawings given by way of illustration only, and thus both of which are not limited to the scope of preferred embodiments of the present invention and wherein.

DETAILED DESCRIPTION OF THE INVENTION

Figure 1:
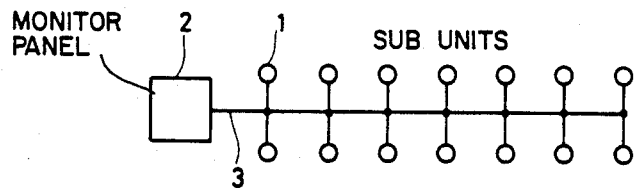
FIG. 1 shows a simplified basic diagram of the centralized monitor system embodied by the present invention.
Figure 2:
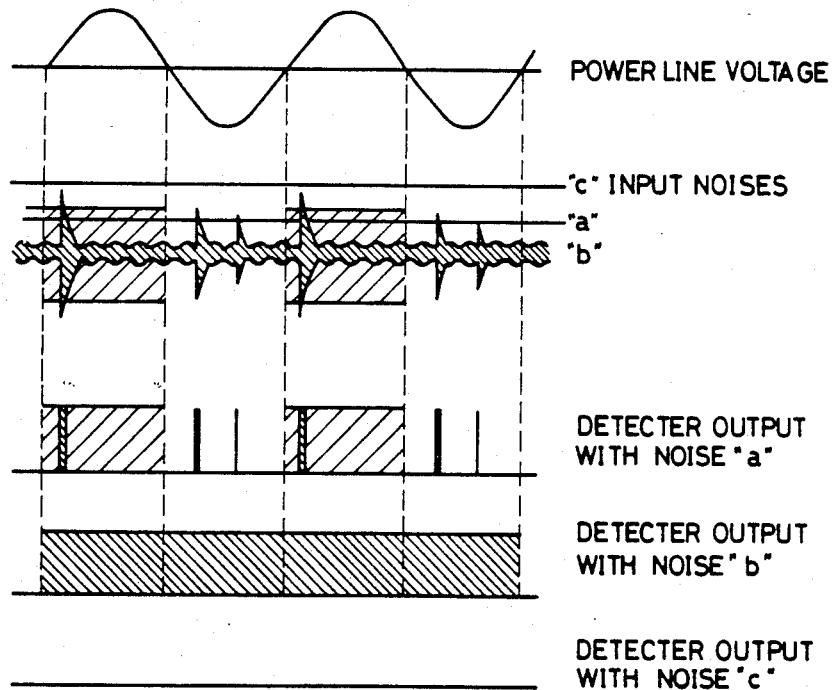
FIG. 2 shows a time chart describing the operation of the centralized monitor system embodied by the present invention.
Figure 3:
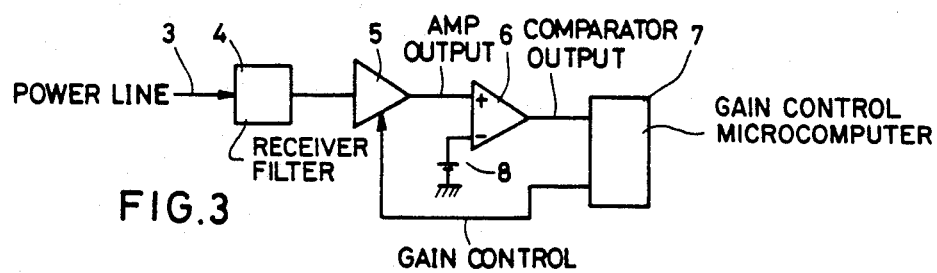
FIG. 3 shows the key block diagram of a preferred embodiment of the present invention.
Figure 4:
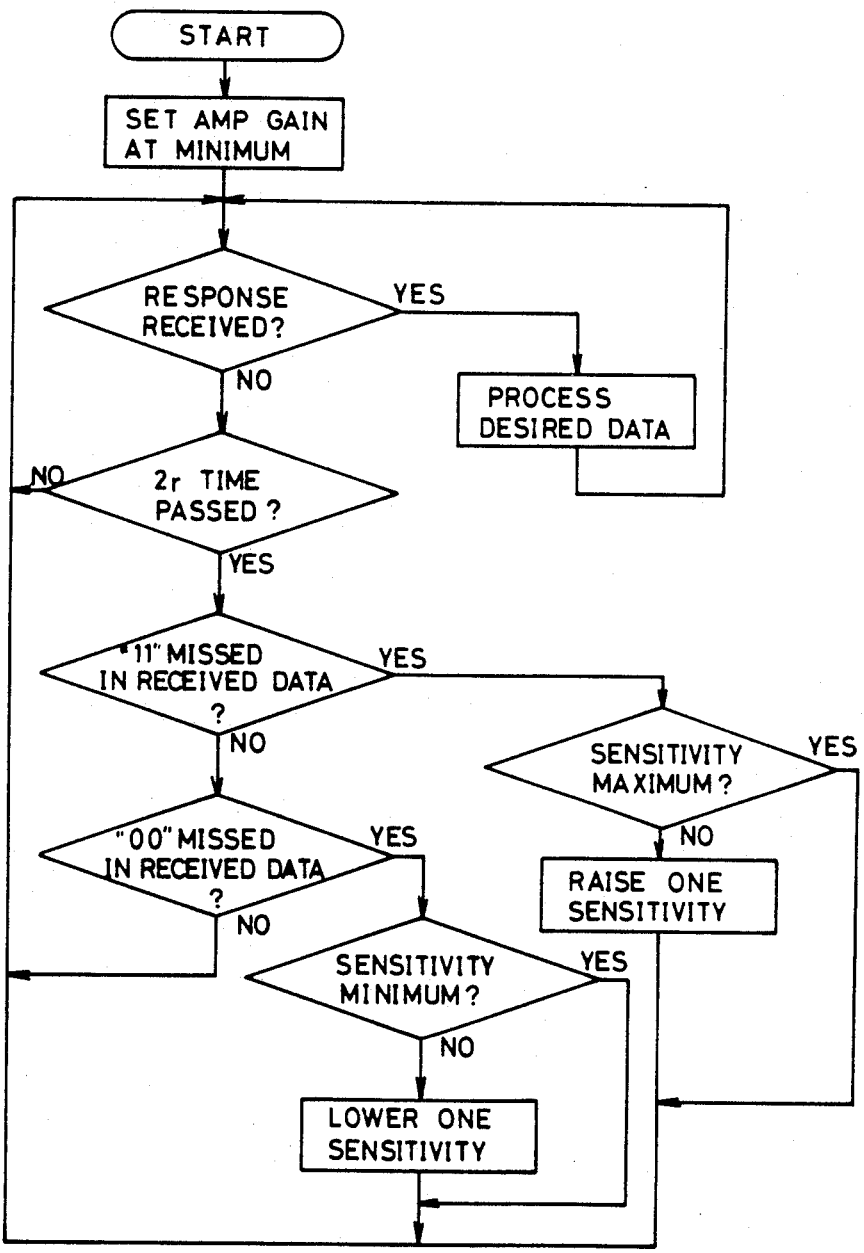
FIG. 4 shows a flow chart describing the operative procedures of the key mechanism shown in FIG. 3.

FIG. 3 shows the key block diagram as a preferred embodiment of the present invention and FIG. 4 shows a flow chart describing the operative procedures of the key mechanism shown in FIG. 3.

In FIG. 3, the said key block comprises the receiver filter 4, variable gain amplifier 5, comparator 6, data processing and amplifier gain control microcomputer 7, and comparator reference voltage generator 8, where the said reference voltage generator 8 selects its operative output level at one half the maximum amplitude of the said amplifier.

As shown in FIG. 4, if a binary code 11 is not present in the received data after a 2r time is past, sensitivity of the variable gain amplifier 5 is intensified by one step, whereas the sensitivity is lowered by one step if a binary code 00 is not present in the received data. Accordingly, an optimum signal receiving sensitivity can be automatically selected within the variable range (between the maximum and minimum sensitivities) of the receiver gain.

If the bits 00 and 11 are simultaneously generated, it means that data signals are encountered with an abnormally intense interference. There are two means to properly vary the incoming signal level, one is to effectively apply any basic step workable, and the other is to apply such sequentially variable steps as with the A/D conversion method. Of these, in view of a certain answer back time needed, the latter method should preferably be selected.

For example, assuming that the signal receiving level is set by 4 bits, a basic step is applied to a variable level by adding either 0001 or 1111 (−1) of the 4 bits, whereas when a sequentially variable step is applied, a binary code 1 is provisionally and sequentially drawn out of the MBS, and then the said binary code 1 will remain in position if the result is satisfactory, while the other binary code 0 will replace 1 if the result is not satisfactory, and so an optinum signal receiving level can be properly selected.

As mentioned above, according to a preferred embodiment of the present invention, the signal receiving level can be automatically controlled exactly at an optimum position despite the presence of a variety of noise components, and as a result, an extremely useful centralized monitor system being totally free from any failure in receiving signals that otherwise can be caused by the noise interference, can eventually be provided.

The present invention described above will obviously signify that the same can be variably developed in many ways. Any of such probable variations cannot however be regarded as a departure from the spirit and scope of the present invention inasmuch as all of such modifications and variations are explicitly included within the scope of the following claims.

What is claimed is:

1. An automatic receiver gain control in a centralized monitor system having a master monitoring panel which periodically communicates with one or more remote monitoring units over a channel, comprising:
    receiving means for monitoring said channel to receive signals present thereon;
    amplifier means, operatively connected to said receiving means, for amplifying said signals monitored thereby to develop amplified signals at its output, the amount of amplification of said amplifier means being controllably variable;
    means for detecting the presence of said communications within said amplified signals, said communications being represented by one and zero states where one of said states corresponds to the presence of a voltage and the other state by the absence of a voltage; and
    control means, responsive to said means for detecting, for controlling the amount of amplification of said amplifier means, said control means increasing the amount of amplification of said amplifying means if no communication is sensed for a period of time greater than the period between periodic communications, said control means decreasing the amount of application if a communication is sensed which has no states corresponding to the presence of voltage therein for a period of time greater than the period between periodic communications.

2. The control of claim 1 wherein said communication is represented in binary ones and zeros, each of said binary ones and zeros being represented by a binary pair including a one state and a juxtaposed zero state;
    said control means increasing the amount of amplification if no binary pair of one states is detected after a period of time greater than the period between communications and decreasing the amount of amplification if no binary pair of zero states is detected after a period of time greater than the period between communications.

3. The control of claim 2 wherein said period of time is greater than the period between communications is equal to twice the period between communications.

4. The control of claim 3 wherein said control means initialize said amplifying means at its minimum amplification.

5. The control of claim 2 wherein said receiving means includes a receiving filter.

6. The control of claim 5 wherein said means for detecting includes a comparator for comparing said amplified signals to a reference voltage.

7. The control of claim 6 wherein said reference voltage is one half the maximum amplitude of said amplifier.

8. The control of claim 3 wherein said channel is an A.C. power line.

* * * * *